US 9,446,787 B2

(12) United States Patent
Asakura et al.

(10) Patent No.: US 9,446,787 B2
(45) Date of Patent: Sep. 20, 2016

(54) BALL SCREW DEVICE, POWER TRANSFER MECHANISM, ELECTRIC POWER STEERING APPARATUS, AND METHOD FOR MANUFACTURING BALL SCREW DEVICE

(71) Applicant: JTEKT CORPORATION, Osaka-shi, Osaka (JP)

(72) Inventors: Toshihiro Asakura, Chiryu (JP); Tetsuya Kaneko, Okazaki (JP); Satoshi Fujita, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/674,045

(22) Filed: Mar. 31, 2015

(65) Prior Publication Data
US 2015/0284020 A1    Oct. 8, 2015

(30) Foreign Application Priority Data
Apr. 7, 2014   (JP) .................................. 2014-078836

(51) Int. Cl.
| B62D 5/04 | (2006.01) |
| F16H 25/22 | (2006.01) |
| B23C 3/30 | (2006.01) |
| F16H 25/20 | (2006.01) |
| F16H 25/24 | (2006.01) |

(52) U.S. Cl.
CPC ............... B62D 5/0448 (2013.01); B23C 3/30 (2013.01); B62D 5/0424 (2013.01); F16H 25/2204 (2013.01); F16H 25/2214 (2013.01); F16H 25/2223 (2013.01); F16H 2025/2081 (2013.01); F16H 2025/2096 (2013.01); F16H 2025/2481 (2013.01); Y10T 74/18576 (2015.01); Y10T 74/19772 (2015.01); Y10T 409/303752 (2015.01)

(58) Field of Classification Search
CPC ............. B62D 5/0448; F16H 25/2214; F16H 25/2223; F16H 25/2228
See application file for complete search history.

(56) References Cited

U.S. PATENT DOCUMENTS

| 3,661,030 | A | * | 5/1972 | Gagne ................. F16H 25/2214 74/424.83 |
| 5,094,119 | A | | 3/1992 | Virga et al. |
| 6,702,060 | B2 | * | 3/2004 | Tatewaki ............. B62D 5/0424 180/444 |
| 6,938,722 | B2 | * | 9/2005 | Sasaki .................. B62D 5/0424 180/443 |
| 9,151,371 | B2 | * | 10/2015 | Sugita ................. F16H 25/2223 |
| 2009/0294203 | A1 | | 12/2009 | Okada et al. |

FOREIGN PATENT DOCUMENTS

| JP | 2007-024229 A | 2/2007 |
| JP | 4807655 B2 | 11/2011 |
| WO | 2008/129692 A2 | 10/2008 |

OTHER PUBLICATIONS

Aug. 24, 2015 Extended Search Report issued in European Patent Application No. 15162212.3.

* cited by examiner

*Primary Examiner* — Kevin Hurley
(74) *Attorney, Agent, or Firm* — Oliff PLC

(57) ABSTRACT

A ball screw device is provided for which quality can be easily evaluated. The ball screw device includes a threaded shaft with a groove formed on an outer peripheral surface of the shaft, and a cylindrical nut whose screw-thread mates with the groove on the threaded shaft via a plurality of balls. The nut has a pair of mounting holes in each of which a deflector is installed and a communication groove that allows the mounting holes to communicate with each other and is open on the outer peripheral surface of the nut and through which the balls can roll. The width W of an opening of the communication groove is smaller than the diameter of the ball.

12 Claims, 5 Drawing Sheets

BALL SCREW DEVICE, POWER TRANSFER MECHANISM, ELECTRIC POWER STEERING APPARATUS, AND METHOD FOR MANUFACTURING BALL SCREW DEVICE

INCORPORATION BY REFERENCE

The disclosure of Japanese Patent Application No. 2014-078836 filed on Apr. 07, 2014 including the specification, drawings and abstract is incorporated herein by reference in its entirety.

BACKGROUND OF THE INVENTION

1. Field of the Invention

The invention relates to a ball screw device, and a power transfer mechanism and an electric power steering apparatus including the ball screw device, and a method for manufacturing the ball screw device.

2. Description of Related Art

As a steering apparatus for vehicles, a rack parallel electric power steering apparatus is known. The electric power steering apparatus includes a ball screw device attached to a rack shaft, a motor, and a speed reducer coupling an output shaft of the motor and the ball screw device together. The motor output shaft is disposed parallel to the rack shaft.

The ball screw device has a nut having a screw-thread, via a plurality of balls, that mates with a spiral groove formed on an outer peripheral surface of the rack shaft. The screw-thread is a spiral groove facing the groove on the rack shaft is formed on an inner peripheral surface of the nut. A space enclosed by the groove in the nut and the groove on the rack shaft forms a rolling path through which balls roll. Furthermore, the nut has a pair of mounting holes penetrating the nut from the groove on the inner peripheral surface to the outer peripheral surface. The mounting holes are arranged so as to be separated from each other in an axial direction of the nut. The mounting holes are in communication with each other via a recessed communication groove formed on the outer peripheral surface of the nut. Furthermore, a deflector is installed in each of the mounting holes. The deflectors installed in the mounting holes and the communication groove provide a circulating path that connects two positions in the rolling path. The circulating path and the rolling path enable the balls to circulate endlessly through the rolling path.

The above-described speed reducer has a driving pulley integrally assembled to the output shaft of the motor, a driven pulley assembled to the nut, and an endless belt wound around both pulleys. In the rack parallel electric power steering apparatus, when the output shaft of the motor rotates, the rotating motion of the output shaft is transmitted to the nut via the driving pulley, the belt, and the driven pulley. Thus, the nut rotates relative to the rack shaft, and the balls circulate endlessly through the rolling path. Through the endless circulation of the balls, an axial assist force is applied to the rack shaft, thereby assisting steering operations of a driver.

In an electric power steering apparatus described in Japanese Patent No. 4807655, the driven pulley is assembled to the outer peripheral surface of the nut to close an opening portion of the communication groove on the outer peripheral surface of the nut. In such a structure, given that the driven pulley is not assembled to the outer peripheral surface of the nut, the ball may fall through the communication groove. Thus, for example, when the ball screw device is evaluated for quality check during the process of manufacturing the electric power steering apparatus, an operation of installing and fixing the driven pulley to the outer peripheral surface of the nut is needed. The need for such an operation correspondingly increases the number of manufacturing steps, reducing operational efficiency. Such a problem occurs not only in the ball screw device used for the electric power steering apparatus but also possibly in ball screw devices used for other apparatuses.

SUMMARY OF THE INVENTION

An object of the present invention is to provide a ball screw device for which quality can be easily evaluated, a power transfer mechanism and an electric power steering apparatus including the ball screw device, and a method for manufacturing the ball screw device.

An aspect of the present invention provides a ball screw device including:

a threaded shaft with a groove formed on an outer peripheral surface of the shaft; and a cylindrical nut whose screw-thread mates with the groove on the threaded shaft via a plurality of balls, wherein the nut comprises a pair of mounting holes in each of which a deflector is installed, and a communication groove that allows the mounting holes to communicate with each other, an opening of the communication groove is formed on an outer peripheral surface of the nut, and the balls are able to roll through the communication groove, and a width of the opening of the communication groove is smaller than a diameter of the balls.

This configuration prevents the balls from falling through the opening of the communication groove. Thus, the balls can circulate between the deflectors installed in the mounting holes without the need to close the opening of the communication groove. Consequently, the ball screw device can be driven without installing any exterior member on the outer peripheral surface of the nut. Thus, the ball screw device can be evaluated for quality check without installing an external member on the outer peripheral surface of the nut, facilitating the quality evaluation of the ball screw device. Furthermore, an operator can visually check a circulating state of the balls through the opening of the communication groove. This further facilitates the quality evaluation of the ball screw device.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Figure 1:
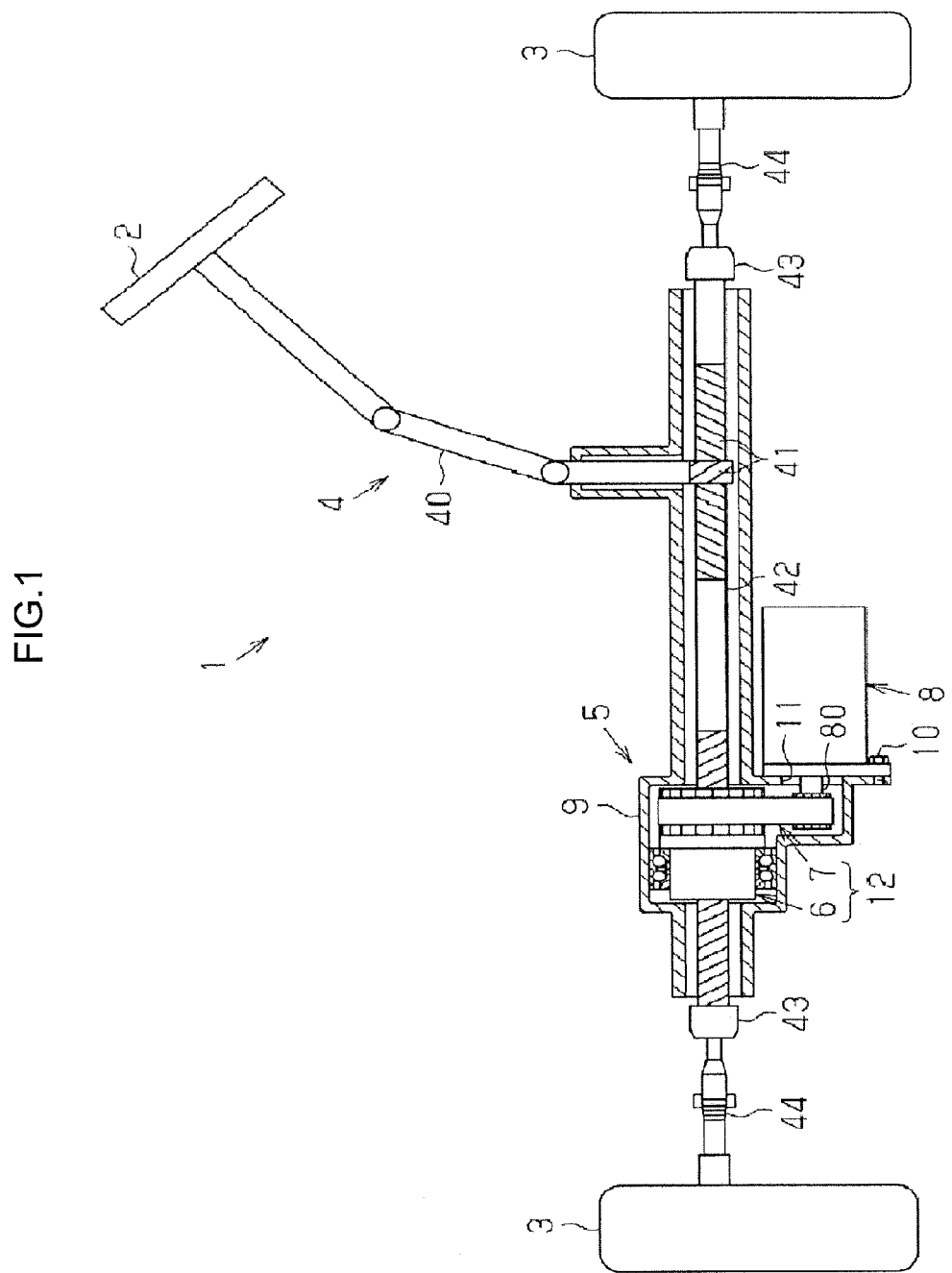
FIG. 1 is a sectional view depicting a general configuration of an embodiment of an electric power steering apparatus.

An electric power steering apparatus equipped with a ball screw device according to an embodiment of the present invention will be described. As depicted in FIG. 1, an electric power steering apparatus 1 includes a steering mechanism 4 that steers steered wheels 3 based on an operation of a steering wheel 2 by a driver, and an assist mechanism 5 that assists a steering operation performed by the driver.

The steering mechanism 4 includes a steering shaft 40 and a rack and pinion mechanism 41. The steering shaft 40 is connected to the steering wheel 2 to transmit rotation of the steering wheel 2 to the rack and pinion mechanism 41. The rack and pinion mechanism 41 is connected to a lower end of the steering shaft 40. The rack and pinion mechanism 41 includes a rack shaft 42. Tie rods 44 are pivotally coupled to both ends of the rack shaft 42 via ball joints 43. The steered wheels 3 are coupled to respective distal ends of the tie rods 44. In the steering mechanism 4, when the steering shaft 40 rotates in conjunction with the operation of the steering wheel 2 by the driver, the rotating motion is converted into axial reciprocating linear motion of the rack shaft 42 via the rack and pinion mechanism 41. The axial reciprocating linear motion of the rack shaft 42 is transmitted to the tie rods 44 via the ball joints 43 to change the steered angle of the steered wheels 3. Thus, the traveling direction of the vehicle is changed.

The assist mechanism 5 is provided around the rack shaft 42. The assist mechanism 5 includes a motor 8 and a power transfer mechanism 12. The power transfer mechanism 12 and the rack shaft 42 are covered with a housing 9. The motor 8 is fixed to an outer wall of the housing 9 via a bolt 10 to place an output shaft 80 of the motor 8 parallel to the rack shaft 42. The output shaft 80 of the motor 8 extends into the housing 9 through a through-hole 11 formed in the housing 9. The power transfer mechanism 12 includes a ball screw device 6 including a part of the rack shaft 42 as a threaded shaft and a speed reducer 7 serving as a power transmission device that transmits rotating motion of the output shaft of the motor 8 to the ball screw device 6.

Figure 2:
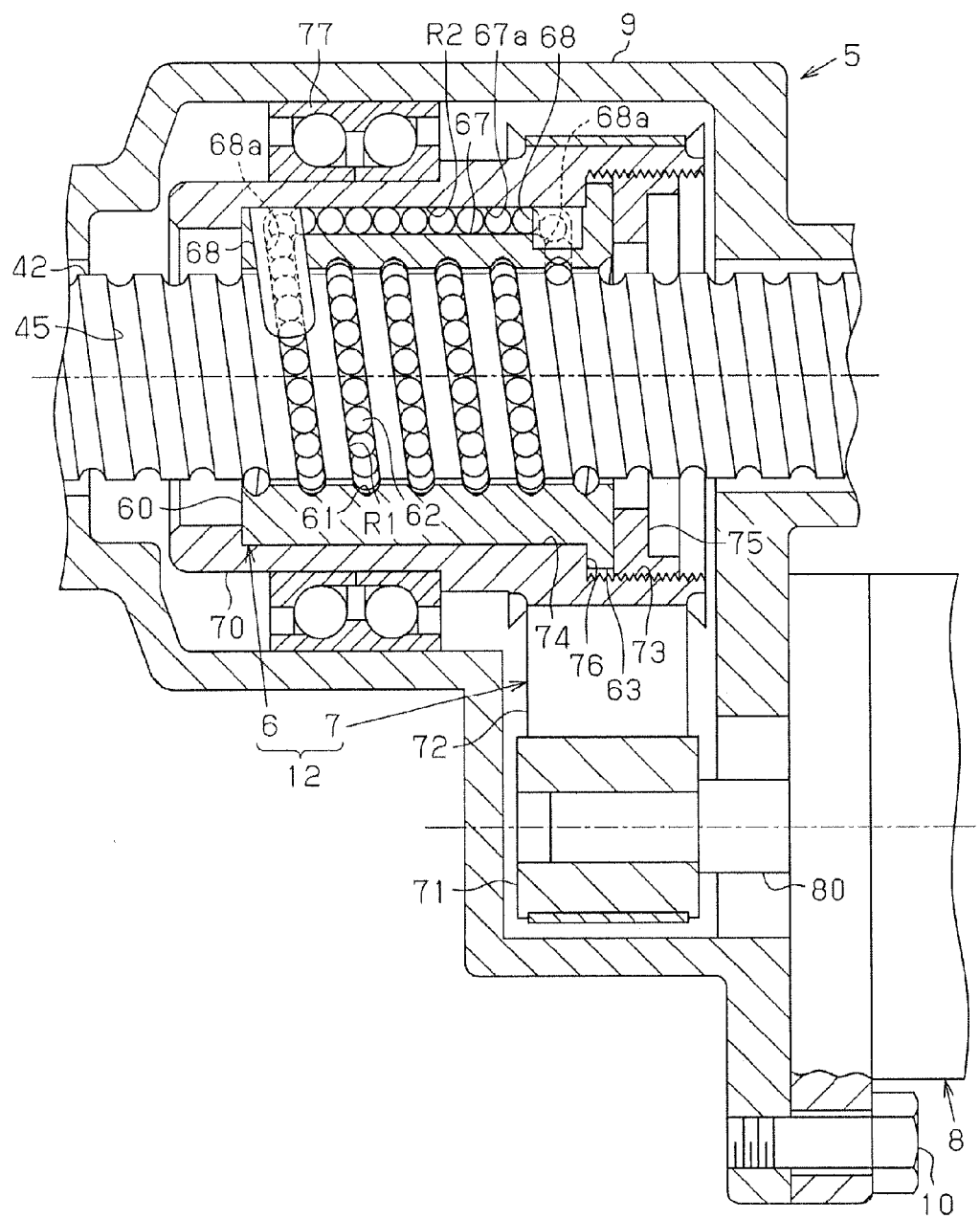
FIG. 2 is a sectional view depicting a sectional structure of a ball screw device and a speed reducer in the electric power steering apparatus according to the embodiment.

A configuration of the power transfer mechanism 12 will be described in detail with reference to FIG. 2. As shown in FIG. 2, a spiral groove 45 is formed on an outer peripheral surface of the rack shaft 42. The ball screw device 6 includes the rack shaft 42, a plurality of balls 62, and a cylindrical nut 60. The cylindrical nut 60 has a screw-thread mating with the groove 45 on the rack shaft 42 via the balls 62. A spiral groove 61 opposite to the groove on the rack shaft 42 is formed on an inner peripheral surface of the nut 60. A space enclosed by the groove 61 on the nut 60 and the groove 45 on the rack shaft 42 forms a rolling path R1 through which the balls 62 roll.

Figure 3:
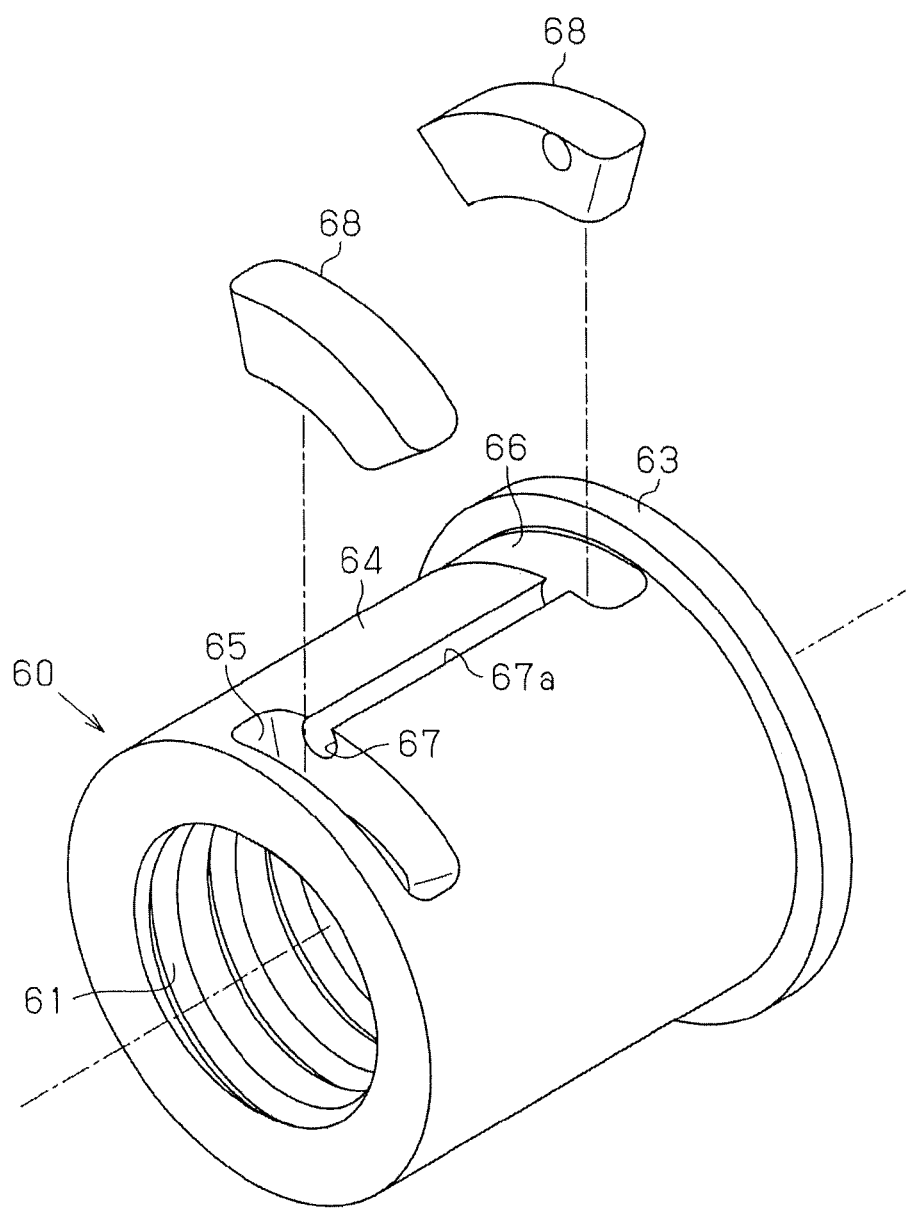
FIG. 3 is a perspective view depicting an exploded perspective structure of a nut in the ball screw device according to the embodiment.
Figure 4:
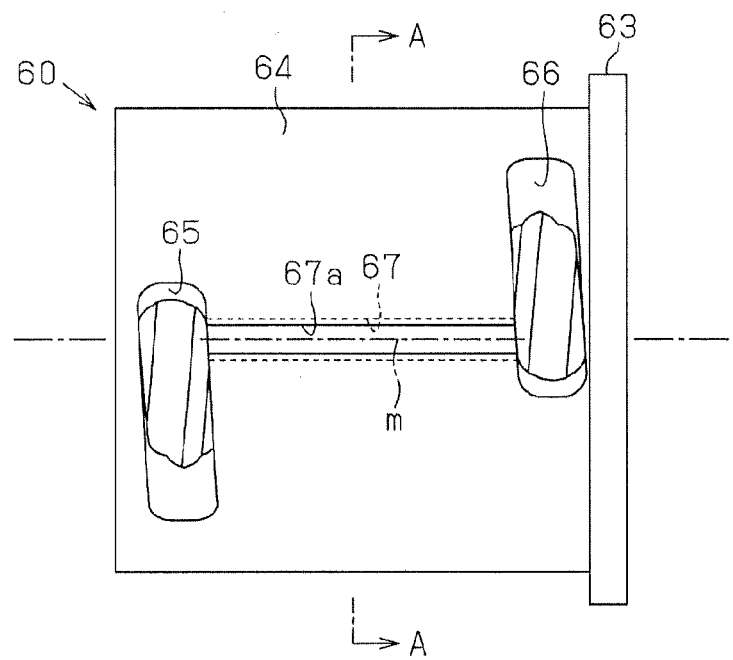
FIG. 4 is a plan view depicting a planar structure of the nut according to the embodiment.
Figure 5:
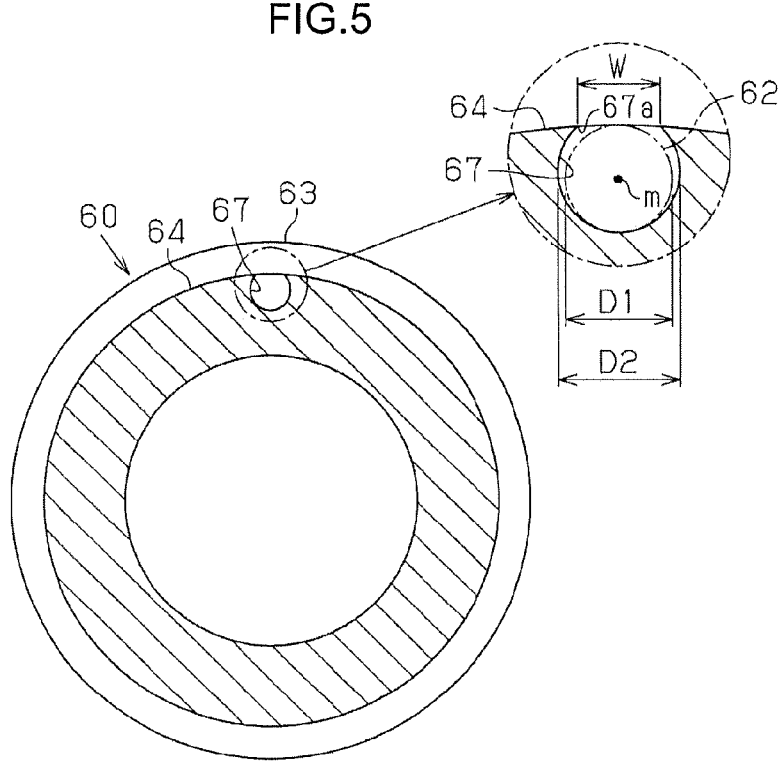
FIG. 5 is a sectional view depicting a sectional structure and taken along line A-A in FIG. 4.

As depicted in FIG. 3, a flange portion 63 is formed at axial one end of the nut 60. Furthermore, a pair of mounting holes 65 and 66 each having a slot shape is formed on the nut 60 so as to penetrate the nut 60 from an outer peripheral surface 64 of the nut to the groove 61 on an inner peripheral surface of the nut. The mounting holes 65 and 66 are arranged so as to be separated from each other in an axial direction of the nut 60, and disposed such that the distance between the mounting holes 65 and 66 corresponds to an axial length of the multiple rows of the groove 45 in the nut 60. Deflectors 68 are installed in the mounting holes 65 and 66 by press fitting. Furthermore, a communication groove 67 that connects the mounting holes 65 and 66 together is formed on the outer peripheral surface 64 of the nut 60. As depicted in FIG. 4 and FIG. 5, the communication groove 67 is formed of a groove having a C-shaped cross section and having an opening 67a on the outer peripheral surface 64 of the nut 60. As depicted in FIG. 5, the diameter D2 of the communication groove 67 is larger than the diameter D1 of the ball 62. Furthermore, the width W of the opening 67a of the communication groove 67 is smaller than the diameter D1 of the ball 62. The width W of the opening 67a according to the present embodiment indicates the length of the opening 67a in a direction orthogonal to an extending direction of the communication groove 67 (the direction shown by an axis m in FIG. 4 and FIG. 5)

As depicted in FIG. 2, a through-hole 68 that couples the rolling path R1 and the communication groove 67 together is formed in each of the deflectors 68. The deflector 68 has a function to guide balls scooped up from the rolling path R1 to the communication groove 67 via a through-hole 68a and a function to discharge the balls 62 in the communication groove 67 to the rolling path R1 via the through-hole 68a. The through-hole 68a in each deflector 68 and the communication groove 67 in the nut 60 provide a circulating path R2 that connects two positions in the rolling path R1 separated from each other in the direction of the axis m. Thus, the balls 62 can circulate endlessly through the rolling path R1 via the circulating path R2.

The speed reducer 7 includes a driven pulley 70 integrally attached to the outer peripheral surface of the nut 60, a driving pulley 71 integrally attached to the output shaft 80 of the motor 8, and an endless belt 72 wound around the pulleys 70, 71.

The driven pulley 70 is shaped generally like a cylinder, and an internal thread hole 73 is formed in an inner peripheral surface of an end of the driven pulley 70. Furthermore, in the inner peripheral surface of the driven pulley 70, an accommodation hole 74 having a smaller diameter than the diameter of the internal thread hole 73 is formed adjacently to the internal thread hole 73 in the axial direction. The nut 60 inserted through the opening of the internal thread hole 73 is press-fitted in the accommodation hole 74. Furthermore, a lock nut 75 with a thread on an outer peripheral surface thereof is screw-threaded in the internal thread hole 73. The flange portion 63 of the nut 60 is sandwiched between the lock nut 75 and a step surface 76 formed between the internal thread hole 73 and the accommodation hole 74 so that the nut 60 is fixed to the driven pulley 70. Furthermore, the driven pulley 70 is supported by a bearing 77 so as to be rotatable relative to the housing 9. The inner peripheral surface of the driven pulley 70 closes the opening 67a of the communication groove 67 in the nut 60.

In the assist mechanism 5 with the power transfer mechanism 12 as described above, when the motor 8 is energized to rotate the output shaft 80 of the motor 8, the driving pulley 71 rotates integrally with the output shaft 80 of the motor 8. Thus, the driving pulley 71 integrally rotates the driven pulley 70 and the nut 60 via a belt 72. At this time, the ball screw device 6 is driven based on a torque applied to the driven pulley 70 and the nut 60. That is, in the ball screw device 6, the driven pulley 70 and the nut 60 rotate relative to the rack shaft 42, and thus, the balls 62 are subjected to a load (normal force and frictional force) from the nut 60 and the rack shaft 42 and roll and circulate endlessly through the rolling path R1. Through the endless circulation of the balls 62, the rack shaft 42 moves relative to the nut 60 in the axial direction. That is, the power transfer mechanism 12 converts the rotating motion of the output shaft 80 of the motor 8 into the axial reciprocating linear motion of the rack shaft 42 via the speed reducer 7 and the ball screw device 6. This allows an axial force to be applied to the rack shaft 42. The axial force applied to the rack shaft 42 is applied to the steering mechanism 4 as an assist force, thereby assisting steering operations performed by the driver.

A method for manufacturing the nut 60 will be described.

Figure 6:
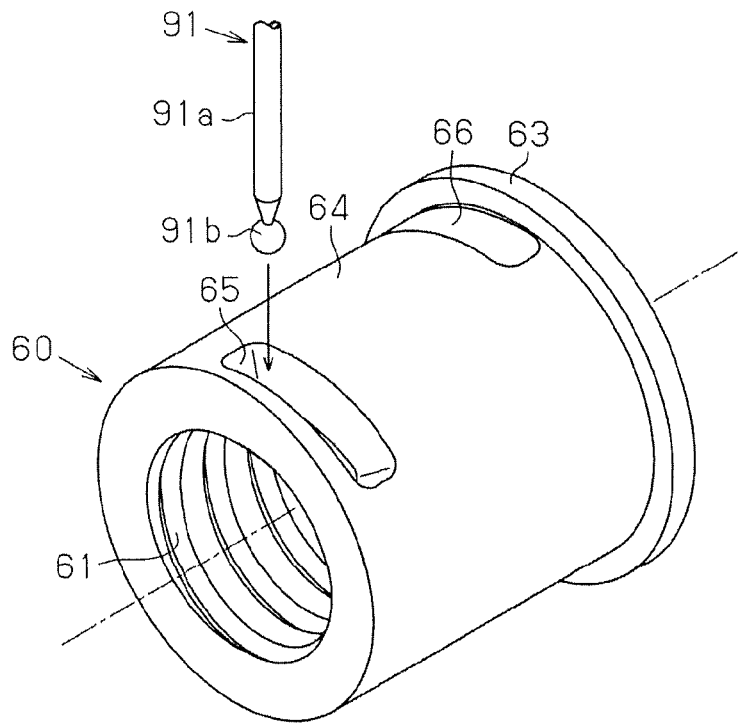
FIG. 6 is a perspective view depicting a part of a process of manufacturing the nut according to the embodiment.
Figure 7:
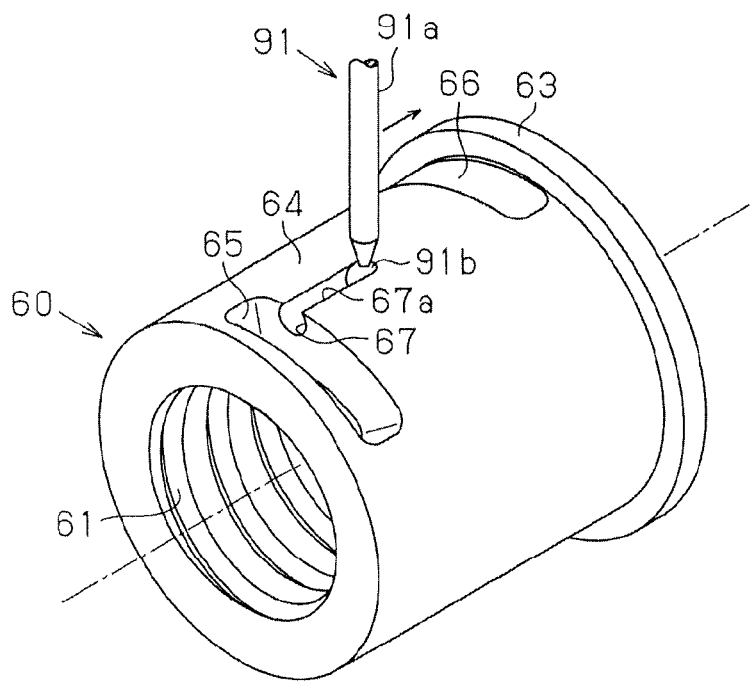
FIG. 7 is a perspective view depicting a part of the process of manufacturing the nut according to the embodiment.

When the nut 60 is manufactured, firstly, the pair of mounting holes 65 and 66 is formed in the nut 60 with the groove 61 and the flange portion 63 as depicted in FIG. 6. Subsequently, the communication groove 67 is formed on the outer peripheral surface of the nut 60 using a ball end mill 91. The ball end mill 91 has a shaft portion 91a with a tip shape like a truncated cone and a spherical cutting edge portion 91b provided at the tip of the shaft portion 91a. The cutting edge portion 91b has substantially the same diameter as the diameter D2 of the communication groove 67. The diameter (outer diameter) of a boundary portion between the tip of the shaft portion 91a and the cutting edge portion 91b is smaller than the width W of the opening 67a of the communication groove 67. For convenience, illustration of the edge of the cutting edge portion 91b is omitted. When the communication groove 67 is formed, the cutting edge portion 91b of the ball end mill 91 is inserted into the first mounting hole 65, and then moved toward the second mounting hole 66 as depicted in FIG. 7. At this time, a shaft portion 91a-side end of the cutting edge portion 91b of the ball end mill 91 cuts the outer peripheral surface of the nut 60 to form, on the outer peripheral surface of the nut 60, the communication groove 67 having the C-shaped cross section and having the opening 67a. The communication groove 67 is formed up to the second mounting hole 66 to complete manufacturing the nut 60.

The above-described electric power steering apparatus 1, ball screw device 6, and power transfer mechanism 12 can achieve operations and effects described below in (1) to (6).

(1) As depicted in FIG. 5, since the width W of the opening 67a of the communication groove 67 formed in the nut 60 is smaller than the diameter D1 of the ball 62, the balls 62 are prevented from falling through the opening 67a of the communication groove 67. Thus, the balls 62 can circulate between the deflectors 68 without the need to close the opening 67a of the communication groove 67. Therefore, the ball screw device 6 can work without the need to install the driven pulley 70 on the outer peripheral surface 64 of the nut 60. Thus, for example, when the ball screw device 6 is independently evaluated for quality check during the process of manufacturing the electric power steering apparatus 1, the quality of the ball screw device 6 can be evaluated without installing the driven pulley 70 on the outer peripheral surface 64 of the nut 60. This facilitates the quality evaluation of the ball screw device 6.

(2) Another method for preventing the balls 62 from falling through the communication groove 67 is, for example, a method of increasing the outer diameter of the nut 60 to provide the communication groove 67 with a completely closed shape. However, when the outer diameter of the nut 60 is increased to the degree that the opening 67a of the communication groove 67 is completely closed, the size of the ball screw device 6 is correspondingly increased. In this regard, the present embodiment allows the outer diameter of the nut 60 to be reduced to the degree that a part of the communication groove 67 is open, enabling reduction in size of the ball screw device 6. Thus, the ball screw device 6 can be more easily mounted in the vehicle.

(3) When the ball screw device 6 is evaluated for quality, the operator can visually check the circulating state of the balls 62 through the opening 67a of the communication groove 67. Thus, the quality evaluation of the ball screw device 6 is further facilitated.

(4) The use of the ball screw device 6 as described above for the electric power steering apparatus 1 allows a quality evaluation operation to be easily performed when the ball screw device 6 is evaluated for quality during the process of manufacturing the electric power steering apparatus 1. As a result, manufacture of the electric power steering apparatus 1 is facilitated.

(5) When the inner peripheral surface of the driven pulley 70 closes the opening 67a of the communication groove 67 in the nut 60, the communication groove 67 serves as a closed passage in which the balls 62 are completely housed. This allows the balls 62 to roll more smoothly through the communication groove 67.

(6) When the communication groove 67 is formed to have a C-shaped cross section, a groove can be easily provided through which the balls 62 can roll and in which the width W of the opening 67a is smaller than the diameter D1 of the balls 62. Furthermore, as depicted in FIG. 7, the communication groove 67 can be formed in the nut 60 simply by machining with the ball end mill 91. Thus, the nut 60 with the communication groove 67 as described above can be easily manufactured.

The above-described embodiment may be realised in the following forms.

First, the shape of the communication groove 67 is not limited to the groove shape with the C-shaped cross section and may be changed as needed. In other words, the communication groove 67 may have any groove shape as long as the communication groove 67 is open on the outer peripheral surface 64 of the nut 60, enables the balls 62 to roll through the communication groove 67, and has the opening 67a of the width W smaller than the diameter D2 of the balls 62.

In the above-described embodiment, the mounting holes 65 and 66 each has a slot shape. However, the shape of the mounting holes 65 and 66 may be changed as needed. Furthermore, the shape of the deflector 68 may be changed so as to conform to the shape of the mounting holes 65 and 66.

In the above-described embodiment, the pair of mounting holes 65 and 66 is formed in the nut 60. However, multiple pairs of mounting holes may be formed in the nut 60. In the above-described embodiment, the belt transmission mechanism including the pulleys 70, 71 and the belt 72 is adopted as the power transmission device that transmits power from the motor 8 to the ball screw device 6. However, instead of the belt transmission mechanism, a chain transmission mechanism may be adopted. That is, the driven pulley 70, the driving pulley 71, and the belt 72 may be replaced with a driven sprocket, a driving sprocket, and a chain, respectively. In this case, the driven sprocket closes the opening 67a of the communication groove 67 in the nut 60. In short, only components of the power transmission device that are attached to the periphery of the nut 60 need to close the opening 67a in the communication groove 67.

The configuration of the ball screw device 6 according to the above-described embodiment is applicable not only to a ball screw device in the electric power steering apparatus but also to a ball screw device mounted in various steering apparatuses such as a steer-by-wire steering apparatus. The configuration of the ball screw device 6 according to the above-described embodiment is also applicable to a ball screw device mounted in apparatuses other than the steering apparatuses. In short, the configuration of the ball screw device 6 may be adopted as long as the ball screw device 6 includes a threaded shaft with a groove formed on an outer peripheral surface of the shaft and a cylindrical nut whose screw-thread mates with the groove in the threaded shaft via a plurality of balls.

What is claimed is:

1. A ball screw device comprising:
   a threaded shaft with a groove formed on an outer peripheral surface of the shaft; and
   a cylindrical nut whose screw-thread mates with the groove on the threaded shaft via a plurality of balls, wherein
   the nut comprises a pair of mounting holes in each of which a deflector is installed, and a communication groove that allows the mounting holes to communicate with each other,
   an opening of the communication groove is formed on an outer peripheral surface of the nut, and the balls are able to roll through the communication groove, and
   a width of the opening of the communication groove is smaller than a diameter of the balls, the communication groove extends in a direction parallel to an axis of the nut and connects the mounting holes together.

2. The ball screw device according to claim 1, wherein the communication groove comprises a groove having a C-shaped cross section and including an opening on the outer peripheral surface of the nut.

3. A power transfer mechanism, comprising:
   the ball screw device according to claim 1; and
   a power transmission device that transmits a torque from an output shaft of a motor to the nut, wherein
   the power transfer mechanism converts rotating motion of the output shaft of the motor into axial reciprocating linear motion of the threaded shaft via the power transmission device and the ball screw device, and
   a component of the power transmission device, which is attached to a periphery of the nut, closes the opening of the communication groove.

4. A power transfer mechanism, comprising:
   the ball screw device according to claim 2, and
   a power transmission device that transmits a torque from an output shaft of a motor to the nut, wherein
   the power transfer mechanism converts rotating motion of the output shaft of the motor into axial reciprocating linear motion of the threaded shaft via the power transmission device and the ball screw device, and
   a component of the power transmission device, which is attached to a periphery of the nut, closes the opening of the communication groove.

5. The power transfer mechanism according to claim 3, wherein
   the power transmission device comprises a driving pulley attached to the output shaft of the motor, a driven pulley attached to an outer periphery of the nut, and an endless belt wound around the driving pulley and the driven pulley, and
   an inner peripheral surface of the driven pulley closes the opening of the communication groove.

6. The power transfer mechanism according to claim 4, wherein
   the power transmission device comprises a driving pulley attached to the output shaft of the motor, a driven pulley attached to an outer periphery of the nut, and an endless belt wound around the driving pulley and the driven pulley, and
   an inner peripheral surface of the driven pulley closes the opening of the communication groove.

7. An assist mechanism for an electric power steering apparatus, the assist mechanism comprising:
   an electric motor; and
   the power transfer mechanism according to claim 3, wherein
   a part of a steered shaft of a steering mechanism of a vehicle is used as the threaded shaft of the power transfer mechanism, and an assist force is applied to the steering mechanism using a translational force applied from the ball screw device to the steered shaft in an axial direction of the steered shaft.

8. An assist mechanism for an electric power steering apparatus, the assist mechanism comprising:
   an electric motor; and
   the power transfer mechanism according to claim 4, wherein
   a part of a steered shaft of a steering mechanism of a vehicle is used as the threaded shaft of the power transfer mechanism, and an assist force is applied to the steering mechanism using a translational force applied from the ball screw device to the steered shaft in an axial direction of the steered shaft.

9. An assist mechanism for an electric power steering apparatus, the assist mechanism comprising:
   an electric motor; and
   the power transfer mechanism according to claim 5, wherein
   a part of a steered shaft of a steering mechanism of a vehicle is used as the threaded shaft of the power transfer mechanism, and an assist force is applied to the steering mechanism using a translational force applied from the ball screw device to the steered shaft in an axial direction of the steered shaft.

10. An assist mechanism for an electric power steering apparatus, the assist mechanism comprising:
    an electric motor; and
    the power transfer mechanism according to claim 6, wherein
    a part of a steered shaft of a steering mechanism of a vehicle is used as the threaded shaft of the power transfer mechanism, and an assist force is applied to the steering mechanism using a translational force applied from the ball screw device to the steered shaft in an axial direction of the steered shaft.

11. A method for manufacturing a ball screw device in which
    the ball screw device comprises a threaded shaft with a groove formed on an outer peripheral surface of the shaft, and a cylindrical nut whose screw-thread mates with the groove on the threaded shaft via a plurality of balls,
    the nut comprises a pair of mounting holes in each of which a deflector is installed, and a communication groove that allows the mounting holes to communicate with each other, the communication groove extending in a direction parallel to an axis of the nut and connects the mounting holes together, and
    an opening of the communication groove is formed on the outer peripheral surface of the nut, and the balls are able to roll through the communication groove, the method comprising:

inserting a cutting edge portion of a ball end mill into a first mounting hole of the pair of mounting holes, and moving the cutting edge portion of the ball end mill toward a second mounting hole of the pair of mounting holes to form the communication groove in the nut.

12. The method for manufacturing the ball screw device according to claim 11, wherein a width of the opening of the communication groove is smaller than a diameter of the balls, the ball end mill has a shaft portion with a diameter decreasing toward a tip of the shaft portion, and the cutting edge portion provided adjacently to the tip of the shaft portion, and a diameter of a boundary portion between the tip of the shaft portion and the cutting edge portion is smaller than the width of the opening of the communication groove.

\* \* \* \* \*